United States Patent [19]

Connelly et al.

[11] 3,970,628

[45] July 20, 1976

[54] AQUEOUS DISPERSIONS OF THERMOSETTABLE SYNTHETIC ADDITION POLYMERS WITH 1,2-EPOXY RESIN PLASTICIZER

[75] Inventors: William Connelly, Willowdale; Hamid Iqbal Khan, Toronto; Ian Hugh McEwan, Kleinburg, all of Canada

[73] Assignee: Canadian Industries, Ltd., Montreal, Canada

[22] Filed: Jan. 30, 1974

[21] Appl. No.: 437,960

Related U.S. Application Data

[63] Continuation-in-part of Ser. No. 378,598, July 12, 1973, abandoned.

[30] Foreign Application Priority Data

July 14, 1972 United Kingdom............... 33084/72
July 14, 1972 United Kingdom............... 33085/72
July 14, 1972 United Kingdom............... 33086/72

[52] U.S. Cl. ...................... 260/29.6 NR; 260/17 A; 260/29.6 H; 260/29.4 UA; 260/29.6 TA; 260/29.6 RW; 260/29.6 WA; 260/29.6 SQ; 260/29.6 MP; 260/29.6 MN; 260/836; 260/837 R; 260/31.2 R; 428/500

[51] Int. Cl.².......................................... C08L 63/10

[58] Field of Search ............... 260/29.6 R, 29.6 NR, 260/29.6 H, 29.6 TA, 29.6 SQ

[56] References Cited
UNITED STATES PATENTS

| | | | |
|---|---|---|---|
| 2,624,718 | 1/1953 | Bezman et al. ................. | 260/29.6 H |
| 2,784,128 | 3/1957 | Schroeder ..................... | 260/29.6 NR |
| 2,954,358 | 9/1960 | Hurwitz ........................ | 260/29.6 NR |
| 3,118,848 | 1/1964 | Lombardi et al. ............. | 260/29.6 NR |
| 3,208,093 | 9/1965 | Hansen ......................... | 260/29.6 H |
| 3,238,170 | 3/1966 | Wolff et al. ................... | 260/29.6 NR |
| 3,331,886 | 7/1967 | Zimmerman et al. ........ | 260/29.6 NR |
| 3,524,828 | 8/1970 | Keithley ........................ | 260/29.6 H |
| 3,652,478 | 3/1972 | Ishii et al. ..................... | 260/29.6 NR |
| 3,840,487 | 10/1974 | Dyson et al. .................. | 260/29.6 H |

Primary Examiner—Harold D. Anderson
Attorney, Agent, or Firm—Joan M. Noonan

[57] ABSTRACT

A process for producing an aqueous dispersion of a thermosettable, solid, water insoluble, addition polymer which comprises polymerizing in water at least one $\alpha,\beta$-ethylenically unsaturated main monomer, which is very slightly soluble in water, with at least one $\alpha,\beta$-ethylenically unsaturated monomer containing a reactive group in the presence of a material selected from the group consisting of surface active agents, suspension agents and mixtures thereof and water soluble, polymerizable ionic monomers consisting of sulpho esters of the formula:

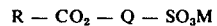

$$R - CO_2 - Q - SO_3M$$

wherein R is selected from the group consisting of vinyl and $\alpha$-substituted vinyl groups, Q is a divalent hydrocarbon radical having its valence bonds on different carbon atoms and M is a cation selected from the group consisting of sodium, potassium, lithium, ammonium, substituted ammonium compounds of the formula $NR'_4$ wherein R' is alkyl ($C_1$-$C_4$) or alkanolamine ($C_1$-$C_3$), morpholine, substituted morpholine derivatives and water soluble salts of vinyl sulphonate and allyl sulphonate and of at least one modifier which is non-reactive or contains at least one complementary reactive group, and when the modifier is non-reactive, incorporating in the polymerization mixtures, at least one $\alpha,\beta$-ethylenically unsaturated monomer containing a complementary reactive group. In addition, the resulting polymerized dispersion may be blended with a water soluble resin. The polymer particles may be formed with the complementary reactive groups located in different layers of the particles or with the groups substantially uniformly distributed throughout their depth. The dispersions may be in the form of suspensions or emulsions. The resulting aqueous dispersions have great utility as coating compositions for glass and steel substrates.

14 Claims, No Drawings

AQUEOUS DISPERSIONS OF THERMOSETTABLE SYNTHETIC ADDITION POLYMERS WITH 1,2-EPOXY RESIN PLASTICIZER

This application is a continuation-in-part of U.S.A. application Ser. No. 378,598 filed on July 12, 1973 now abandoned.

This invention relates to aqueous dispersions of modified synthetic addition polymers of the thermosetting type.

There have already been proposed methods for incorporating modifiers such as plasticizers or compatible polymeric materials in the particles of polymers dispersed in non-aqueous liquids. Such modifiers are desirable when the dispersions are to be used in coating compositions and the characteristics of the coating films produced therefrom require alteration, e.g. in respect of hardness, flexibility, weathering, gasoline resistance, etc.

Various methods have been proposed for incorporating these modifiers. One example of such methods is found in Canadian Pat. No. 672,723 granted to Imperial Chemical Industries Limited on Oct. 22nd 1963. In this patent, there is disclosed in a process for making a stable dispersion of a solid addition polymer in an inert organic liquid in which the polymer is insoluble which comprises polymerizing at least one ethylenically unsaturated monomer dissolved in said organic liquid in the presence of a member of the group consisting of organic block and graft copolymers of which one polymeric constituent is compatible with, and is co-precipitated with, the polymer and another polymeric constituent is solvated by the organic liquid and stabilizes the polymer dispersion, the improvement comprising carrying out the polymerization in the presence of a compatible film-forming resin i.e. plasticizer. The resin is present in an amount which would normally be insoluble in the organic liquid alone but is dissolved by the monomer being polymerized. It is to be noted that in this method the monomer must be soluble in the inert organic liquid. The polymerization continues with the resin precipitating out with the polymer as the monomer is used up. The result is a stable non-aqueous dispersion of the modified polymer.

In addition to the above described non-aqueous dispersion systems, there have also been described aqueous polymer systems in which such modifiers have been incorporated. However, in these aqueous systems, the modifiers have been added to the preformed polymers, usually by adding emulsions of the modifiers to the dispersed polymers. Alternatively, the modifiers have been mixed with granules of the preformed polymers. In this way the modifiers gradually diffuse into the polymer particles. However, these processes are, at best, most uncertain. The addition of the modifiers can upset dispersion stability or lead to sticky intractable materials. The latter occurs particularly when the modifiers are liquid, which is frequently the case with low molecular weight plasticizers.

As indicated previously, the modifier is added to the polymer to render it rubbery, i.e., to depress the glass transition temperature, $T_g$ (temperature at which transition from glass to rubber occurs), for subsequent use of the polymer in coating compositions. However, the rate of diffusion of modifier into polymer is very slow, being controlled principally by the following:

1. the nature and molecular weight of the modifier;
2. the nature and molecular weight of the polymer;
3. the temperature at which the modifier is combined with the polymer;
4. whether the temperature of No. 3 is above or below the glass transition temperature; and
5. if the modifier is added to the polymer in dispersion, the solubility of the modifier in the liquid medium of the dispersion.

Working with these considerations and following the methods previously proposed for adding the modifier to the polymer can be difficult. Frequently to obtain uniform incorporation of the modifier, an excess must be used. The use of excess modifiers may lead to application problems of sweating, fogging and oversoftening, etc., for film obtained from coating composition in which modified polymer is incorporated.

In contrast with the above described procedures, it has now been found that by adding the modifier to an aqueous dispersion polymerization system simultaneously with the monomer or monomers, the necessity of considering points 2, 3 and 4 listed above can be substantially eliminated, the only exception being the consideration of the nature of the polymer relative to the nature of the modifier, i.e., their mutual compatibility. This last factor is important where high gloss values are required. Furthermore, by the method herein proposed, the use of the excess modifier with its associated problems is unnecessary to achieve uniform incorporation of the modifier. Finally, and in this age most importantly the liquid medium is water and the pollution problems associated with the organic liquids are eliminated.

According to this invention, there is provided a process for producing an aqueous dispersion of a thermosettable, solid, water insoluble, synthetic addition polymer which comprises polymerizing in water at least one $\alpha,\beta$-ethylenically unsaturated main monomer which is very slightly soluble in water, with at least one $\alpha,\beta$-ethylenically unsaturated monomer containing a reactive group in the presence of a stabilizing material selected from the group consisting of surface active agents, suspension agents, mixtures of surface active agents and suspension agents and water soluble, polymerizable ionic monomers consisting of sulpho esters of the formula:

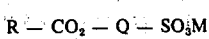

wherein R is selected from the group consisting of vinyl and $\alpha$-substituted vinyl groups, Q is a divalent hydrocarbon radical having its valence bonds on different carbon atoms and M is a cation selected from the group consisting of sodium, potassium, lithium, ammonium, substituted ammonium compounds of the formula $NR'_4$, wherein $R'$ is alkyl ($C_1$-$C_4$) or alkanolamine ($C_1$-$C_3$), morpholine and substituted morpholine derivatives and water soluble salts of vinyl sulphonate and allyl sulphonate, and of at least one modifier which is non-reactive or contains at least one complementary reactive group and when the modifier is non-reactive, incorporating in the polymerization mixture at least one $\alpha,\beta$-ethylenically unsaturated monomer containing a complementary reactive group and when required, removing the water from the resulting aqueous dispersion to obtain the polymer in a stable dry particulate form.

In a modification of the process of the invention, there is included the additional step of blending the polymerized dispersion with a water soluble resin.

In a further modification of the process of this invention, when the stabilizing material is principally an ionic monomer as described previously, preferably the modifier is selected from the group consisting of monomeric esters, epoxy resins, melamine-formaldehyde resins and urea-formaldehyde resins, with the resulting polymer dispersion being in the form of an emulsion.

This invention also provides a thermosettable aqueous dispersion of a solid, water insoluble, synthetic addition polymer which comprises a polymerized aqueous dispersion of at least one very slightly water soluble $\alpha,\beta$-ethylenically unsaturated main monomer with at least one $\alpha,\beta$-ethylenically unsaturated monomer containing a reactive group and a modifier which contains at least one complementary reactive group or is non-reactive, and when the modifier is non-reactive, the dispersion containing at least one $\alpha,\beta$-ethylenically unsaturated monomer containing a complementary reactive group.

The aqueous dispersions of this invention may be modified by blending them with a water soluble resin.

A further feature of the invention lies in a thermosettable coating composition comprising the above aqueous dispersion of particles of a water insoluble modified thermosettable synthetic addition copolymer as the main film-forming ingredient.

Another feature of the invention is a method for forming a thermoset film on a substrate, which comprises applying to the substrate a layer of the thermosettable coating composition as defined above and heating said layer to evaporate the water, to fuse the layered particles and to react the complementary reactive groups to form an integrated thermoset film.

As indicated earlier, the main monomers used in the process of this invention are very slightly soluble in water. Preferably the water solubility of the monomers should not exceed 10% by weight and most preferably 3% by weight. At the same time it has been found that the solubility of the monomers should preferably be matched with the solubility of the modifier. The monomers which contain the reactive groups are also preferably insoluble. However, a water-soluble monomer, e.g. N-vinyl pyrrolidone, might be used in amounts up to 25% by weight, based on the weight of total solids without affecting the properties of the polymers unduly. Such a monomer must be compatible with the reactive monomers and thus the choice of a suitable water soluble monomer is limited in this respect. It would appear that when such a water soluble monomer is present, the monomer partitions itself between the insoluble monomer phase and the water and preferentially in the monomer phase. Preferably, the water soluble monomer has a distribution ratio greater than 0.1 and more preferably greater than 1.0 (measured at room temperature). Distribution ratio may be defined as the ratio of the weight of a component in monomer to the weight of the same component in water, where equal parts of monomer and water are used. Alternatively, whether a water soluble monomer can be used can be determined by experiment, e.g. if the reactive monomer were present in the final polymer and was not dissolved in the water or vice versa.

The main monomers which may be used in the process of the invention are very slightly water soluble, $\alpha,\beta$-ethylenically unsaturated monomers. Suitable monomers include styrene, lower alkyl -methacrylates, -acrylates, -itaconates, -maleates, -fumarates, vinyl esters, such as vinyl acetate and vinyl chloride.

Preferred main monomers include styrene and methyl methacrylate. When more than one monomer is present as the main monomer, the preferred monomer combinations are styrene/butyl acrylate, methyl methacrylate/butyl acrylate, styrene/butyl methacrylate, and methyl methacrylate/styrene/butyl acrylate.

The monomers containing the reactive and complementary reactive groups may be selected from acrylic acid, methacrylic acid, itaconic acid, maleic acid, fumaric acid, acrylamide, lower alkyl acrylamides, N-alkoxy modified acrylamides, such as N-hydroxymethylacrylamide and N-butoxymethyl acrylamide, diacetone acrylamide, maleamic acid, maleamide, furamide, N-monoalkyl/aryl substituted amides, hydroxyethyl methacrylate and hydroxy propyl methacrylate. Preferably methacrylic acid is employed.

The modifiers containing at least one reactive group or reactive modifiers as used in the present specification include those substances known as plasticizers which are capable of reacting with the functional groups of the reactive monomers. Compounds of this type which are suitable for use in the process of the invention include compatible film-forming resins, e.g. epoxy resins, melamine-formaldehyde resins and urea-formaldehyde resins. By the term "non-reactive modifiers" is meant those plasticizing substances which do not react with the monomers such as low molecular weight polymeric esters, monomeric esters and polyalkylene glycols.

Examples of epoxy resins are: "Cardura" E (Trade Mark) which is a glycidyl ester produced by reaction of epichlorohydrin and a mixture of saturated, highly branched, mainly tertiary monocarboxylic acids having $C_9$, $C_{10}$ and $C_{11}$ chain length ("Versatic" acid), "Genepoxy" M205 (Trade Mark) which is a modified diglycidyl ether of bisphenol A, "Epon" 812 (Trade Mark) which is a diglycidyl ether of glycerol, "Epon" 826 (Trade Mark) which is substantially pure diglycidyl ether of bisphenol A, and "Epon" 828 (Trade Mark) which is a slightly resinified form of "Epon" 826.

Examples of suitable melamine-formaldehyde resins include such commercially available resins as "Cymel" 300, "Cymel" 301, "Cymel" 303 ("Cymel" is a Trade Mark), "Uformite" MM-83 ("Uformite" is a Trade Mark) and "Resimene" 740 ("Resimene" is a Trade Mark), as well as conventional alkylated, e.g. butylated melamine-formaldehyde resins.

Examples of suitable urea-formaldehyde resins include conventional alkylated urea-formaldehyde resins.

Examples of polymeric esters include butyl- and benzyl-terminated diethylene glycol adipates, maleates and phthalates, and benzyl-terminated diethylene glycol epoxy resin adipates.

Examples of monomeric esters are dibutoxy ethyl ether succinate, dibenzyl adipate, dibenzylphthalate and neopentyl glycol di-benzoate.

An example of a polyalkylene glycol is polypropylene glycol having, for example a molecular weight of 1025.

When a reactive modifier is employed in the process of this invention, a proportion of non-reactive modifier may be substituted for some of the reactive modifier. The quantity of modifer which may be incorporated into the polymer may be form 0.5% to 50% by weight based on the weight of total solids. Where a non-reactive modifier is included in the composition in addition to the reactive modifer, the proportions of each taken together will total a quantity within the above range.

The proportion of modifier incorporated into the polymer is dependent on the subsequent use of the polymer dispersion. For example, when the polymer dispersion is to be used in the automotive field, an epoxy resin is the preferred modifier and the proportion thereof may preferably range from 0.5% to 5.0% by weight, more preferably from 1.0% to 3.0% by weight, based on the weight of total resin solids.

Some of the most useful polymerized dispersions produced by this invention include those wherein the main monomer is selected from the group consisting of methyl methacrylate, styrene, styrene/butyl acrylate in the respective weight proportions of 90/10 and 80/20, methyl methacrylate/butyl acrylate in the respective weight proportions of 90/10, 80/20, 70/30 and 85/15, styrene/butyl methacrylate in the range of respective weight proportions of from 50/50 to 85/15, styrene/butyl acrylate in the respective weight proportions of 50/45 and 40/50, and methyl methacrylate/styrene/butyl acrylate in the respective weight proportions of 10/20/60; the reactive monomer is methacrylic acid and is used in a proportion in the range of from 1% to 10% by weight, preferably from 1% to 3% by weight, based on the weight of total solids; and the modifier is "Epon" 828 which is a Trade Mark for a slightly resinified form of diglycidyl ether of bisphenol A and is used in a proportion in the range of from 1% to 15% by weight, preferences being from 1% to 3% by weight, from 10% to 15% by weight and from 0.5% to 1.5% by weight, based on the weight of total solids.

As indicated previously, there are two main criteria in choosing the modifier. The first is its molecular weight and the other is its solubility in water. In order to more closely match the former criteria, a surface active substance is included. The choice of such substance is critical as it directly influences the solubility of the modifier in water. Another criteria resides in the compatibility of the modifier with the polymer. Preferably the solubility parameter of the modifier is matched with that of the monomer or monomers. For example, if a polyester plasticizer which is to be incorporated in the polymer has a water solubility of $0.1 \times 10^{-4}$ molar, a powerful surface active substance should be chosen to further solubilize the plasticizer, e.g. an alkyl phenyl sulphonate or sulphate. However, if the water solubility of the polyester plasticizer exceeds $1.0 \times 10^{-4}$ molar, a weaker surface active substance can be employed, e.g. a sodium alkyl aryl polyoxyethylene sulphonate. Once the choice of modifier is made, the choice of surface active substance is relatively simple and obvious in view of the above statement.

In accordance with the requirements of this invention, the process of this invention may be carried out using surface active agents, suspension agents or mixtures thereof. If only surface active agents are employed, the resulting polymer dispersion will be in the form of an emulsion with the size of the polymer particles varying from 0.5 μm to 250 μm diameter. The use of suspension agents results in polymer particles of a larger size and the dispersion is, of course, referred to as a suspension. The particle size varies from 0.01 mm. to 5.0 mm. diameter, preferably from 0.1 mm. to 1.01 mm. Small quantities of surface active agents may be used with the suspension agents to aid in the polymerization.

Examples of surface active substances known in the art which may be successfully employed in the process of this invention include the following, either alone or in combination: "Benax" 2 Al (Trade Mark) which is sodium dodecyl diphenyl ether disulphonate, "Igepal" CO 730 (Trade Mark) which is nonyl phenoxypoly (ethylenoxy 15) ethanol, "Igepon" T 77 (Trade Mark) which is sodium N-methyl-N-oleoyllaurate, "Aerosol" TR (Trade Mark) which is the bis (tridecyl) ester of sodium sulphosuccinic acid, "Triton" X-200 (Trade Mark) which is sodium alkylaryl polyether sulphonate (28% solids solution), "Sipon" WD (Trade Mark) which is sodium lauryl sulphate, and "Siponate" DS-10 (Trade Mark) which is sodium dodecyl benzene sulphonate.

The suspension agents used in the process of this invention are water soluble and, unlike the surface active agents, they do not contaminate the polymer particles as they are easily removed by washing. These agents also seem to prevent agglomeration of the particles during polymerization as well as aiding in the suspension of the polymer. Suitable substances include small quantities of water soluble polymers, e.g. partially hydrolyzed polyvinyl acetate and/or small amounts of water soluble inorganic salts such as trisodium phosphate may be added to the aqueous phase.

The proportion of surface active substance may preferably range from 0.01% to 7.5% by weight, more preferably 0.04% to 4.5% by weight, based on the weight of total solids. The proportion of suspension agents may be selected according to conventionally known practices.

The polymerizable ionic monomers which may be used as stabilizing materials according to the invention are typically described in U.S. Pat. Nos. 2,914,499, 2,923,734, 3,024,221 and 3,033,833 granted to the Dow Chemical Company on Nov. 24, 1959, Feb. 2, 1960, Mar. 6, 1962 and May 8, 1962, respectively. When these monomers are used, very little, if any, of the above-mentioned surface active agents is required to stabilize the polymer particles.

A very small percentage of a conventional surface active agent is preferably included with the polymerizable ionic monomer. For example, not more than 0.2% by weight, based on the weight of total monomers, of surface active agent is required, when from 1% to 5% by weight of the ionic monomer, based on the weight of total monomers is included in the polymerization mixture. The surface active agent may be selected from the agents described earlier.

The sulpho esters represented by the above structural formula are described at length in the above-mentioned Dow U.S. patents. However, some of the useful ionic monomers include 2-sulphoethyl acrylate, 2-sulphoethyl α-ethylacrylate, 2-sulphoethylα-butylacrylate, 2-sulphoethyl α-hexylacrylate, 2sulphoethyl α-cyclohexylacrylate, 2-sulphoethyl α-chloroacrylate, 2-sulpho-1-propyl acrylate, 2-sulpho-1-propyl methacrylate, 1-sulpho-2-propyl acrylate and methacrylate, 2-sulpho-1-butyl acrylate and methacrylate, 1-sulpho-2-butyl acrylate and methacrylate, 3-sulpho-2-butyl acrylate and methacrylate, 2-methyl-2-sulpho-1-propyl acrylate, 2-methyl-1-sulpho-2-propyl acrylate, 3-bromo-2-sulpho-1-propyl acrylate, 3-bromo-1-sulpho-2-propyl acrylate, 3-chloro-2-sulpho-1-propyl acrylate, 1-bromo-3-sulpho-2-butyl acrylate, 1-bromo-2-sulpho-3-butyl acrylate, 1-chloro-3-sulpho-2-butyl acrylate, 1-chloro-2-sulpho-3-butyl acrylate, 3-bromo-2-sulpho-1-butyl acrylate, 3-bromo-1-sulpho-3-butyl acrylate, 3-chloro-2-sulpho-1-butyl acrylate, 3-chloro-1-sulpho-2-butyl acrylate, 1-chloro-2-methyl-3-sulpho-2-propyl acrylate, 1-chloro-2-methyl-2-sulpho-3-propyl acrylate, 1-chloro-2-(chloromethyl)-3-sulpho-2-propyl acrylate, 1-chloro-2-(chloromethyl)-2-sulpho-3-propyl acrylate, 3-methoxy-2-sulpho-1-propyl acrylate, 3-methoxy-1-sulpho-2-propyl acrylate, 2-sulphocyclohexyl acrylate, 2-phenyl-2-sulphoethyl acrylate, 1-phenyl-2 -sulphoethyl acrylate, 3-sulpho-1-propyl acrylate, -3-sulpho-1-butyl acrylate, 4-sulpho-1-butyl acrylate, ar-sulphophenyl acrylate, ar-sulphophenyl methacrylate, 2-(ar-sulphophenoxy)ethyl acrylate and their sulphonate salts.

The most preferred ionic monomers are the salts of 2-sulphoethyl methacrylate, vinyl sulphonate and allyl sulphonate.

The plasticizers or modifiers which may be incorporated into polymer latex particles are preferably the monomeric plasticizers, examples of which have been previously mentioned. Preferred plasticizers are dibenzyl adipate, dibenzyl azelate, dibenzyl sebacate, and dimethyl sebacate. Other plasticizers, such as the polyester type described earlier can be incorporated using this modified method, but increasing levels of the conventional surface active agent are required, e.g. from 0.5% up to 1.0%, which higher levels result in losing some of the advantages gained by using the ionic monomer as the principal stabilizing material. In addition, it is possible to incorporate resinous modifiers such as compatible film-forming resins, e.g. epoxy resins, melamine-formaldehyde resins and urea-formaldehyde resins.

Particular resins of these general types have been mentioned earlier. However, a preferred resin is "Epon" 828.

The water soluble resins with which the polymerized aqueous dispersions of this invention may be blended can be characterized as any commercially available resins which are soluble in water at a pH $\geq$ 6.

the polymer particles obtained by the process of this invention may be layered such that one reactive group is in one layer and a complementary reactive group is in another layer. This layering is achieved by the timed addition of the monomers and modifier. This timed addition may be carried out in various ways, e.g. a "seed" or "core" may be formed of the main monomer with some of the reactive monomer and with slow addition of the remaining portions of monomers and modifier. This may be termed a "split feed" polymerizaion technique and is considered to be particularly useful in the preparation of thermosetting dispersion polymers since reactive groups remain relatively isolated during polymerization but in close enough proximity to produce a high degree of reaction between complementary reactive groups on baking. This isolated condition is maintained until the particles lose their separate identity. Preferably the reactive monomer is included in the "core" or "seed" and the reactive modifier on monomer containing the complementary reactive groups is added so that it is in the outermost layers of the particles, since this type of particle appears to be most stable.

The technique may involve charging a reaction vessel as outlined below, although variations of the following scheme may be employed. The first charge comprises a proportion of the water-soluble components while the second charge which results in the formation or a "seed" or "core" comprises essentially a reactive monomer and one or more main monomers in emulsified form. The third charge comprises an emulsion of a reactive modifier or monomer containing the complementary reactive groups and further proportions of the main monomers. The final charge which is optional, comprises essentially an emulsion of proportions of the main monomers and is used to "mop up" any additional reactive modifier which may be present.

There are various methods known for making polymer dispersions and the following are representative of some which may be employed in the process of this invention.

For simplicity, they may be described by the following titles: 1) "emulsified monomer feed" process 2) "monomer feed" process, 3) "modifier seed" process and 4) "single feed" process.

In the "emulsified monomer feed" process, the monomers, modifier, a portion of the surface active substance and a portion of the water are emulsified by vigorous agitation. These are slowly charged to the reaction vessel which contains all of the other components. The addition of the emulsion may continue for as long as 6 to 8 hours depending on the solubilities of the monomers and modifier. Agitation of the emulsion may be continued over the time of addition if necessary.

In the "monomer feed" method, all of the water-soluble components of the system and water are charged to the reaction vessel and the monomer or monomers and modifier are added over a period of several hours. This time of addition is of course dependent on the solubilities of the various components.

In the third method, the "modifier seed" process, all of the soluble components, the modifier and the water are charged to the reaction vessel and the monomer or monomers are added over a period of several hours. Again the addition time depends on the solubilities of the monomer or monomers.

In the "single feed" method, some of the surface active substance, polymerization initiator and water are charged to a vessel and heated, and an emulsion of all of the remaining ingredients is added over a period of several hours.

When the stabilizing material is principally an ionic monomer, the polymerization method used is preferably the monomer feed method.

If the modified polymer is to be used as a liquid coating, the size of the particles of the modified dispersed synthetic polymer may be from 0.1 $\mu$m to 5 $\mu$m. The size of particle obtained is determined by the method of polymerization.

The molecular weight of the final modified polymer may be controlled by the addition of conventional agents used for this purpose, e.g. chain transfer agents, such as primary octyl mercaptan or monomethyl ether of dipropylene glycol.

The molecular weight of the modified polymer will be governed by the polymerization method but the limits chosen for the molecular weight will be determined by the intended use of the polymer. For example, using intrinsic viscosity [$\eta$] measured in decilitres/gram (dl.g.$^{-1}$) as a measure of molecular weight, normally latex polymers have a high molecular weight, [$\eta$]>0.6 dl.g$^{-1}$. Typically, for an acrylic polymer, [$\eta$]>1.0 dl.g.$^{-1}$. In order to produce paints from high molecular weight modified thermosettable polymers having high gloss values according to the present invention [$\eta$] is preferably chosen not to exceed 0.6 dl.g.$^{-1}$ and more preferably should be from 0.3 to 0.4 dl.g.$^{-1}$. It has been found that where [$\eta$[<0.1 dl.g.$^{-1}$ durability will suffer and excess amounts of chain transfer agents will be required. When the dispersed modified thermosettable polymers of this invention are converted to dry particulate form and used in powder coating composition, the range for $[\eta]$ is preferably 0.1 to 0.6 dl.g.$^{-1}$ and more preferably 0.2 to 0.4 dl.g.$^{-1}$. These limits have been found to give polymers which produce films of a particularly high quality. Certainly, it is possible to produce useful films with polymers of higher molecular weights.

Conventional polymerization initiators may also be employed. For example, persulphates, hydrogen peroxide, perborates, peroxides, hydroperoxides, and azo compounds soluble in the monomers or in water with convenient radical forming reaction rates, including redox systems, can be used.

Although the films formed from the dispersions of this invention may crosslink at room temperatures without the use of catalysts, it is possible to employ catalytic materials to aid the crosslinking reaction between the complementary reactive groups. Such catalysts may be selected from those known and conventionally used for this purpose, the particular choice being made on the basis of the type of complementary reactive groups present in the dispersion. Examples of catalysts which may be used for dispersions containing carboxyl and epoxy groups are amines, such as diethanolamine, dimethylethanol amine, di-n-propyl amine, ethylene diamine, hexane diamine, isophorone diamine, triethanol amine, tetraethylene pentamine, trimethyl hexane diamine and the like and metal-amine complexes, such as zinc bis (dimethylethanol-amine) acetate and the like. Other types of catalyst include copolymerized acids and external acids, usually strong inorganic or organic acids having a pk>4. Latent catalysts may also be used, such as the morpholine salt of p-toluene sulphonic acid.

The aqueous modified polymer dispersions of this invention may be formulated into coating compositions as indicated previously. When desired pigments may be incorporated into the dispersions by formulating dispersions of the pigments and adding them to the polymerization systems either before or after polymerization of the monomers and modifiers. In addition, other conventional paint additives may be included in said compositions, fillers, dyes, resins and the like.

The aqueous modified polymer dispersions may be converted to dry particulate form by removing the water by known means, e.g. by evaporation carried out under reduced pressure spray drying and fluidized bed techniques. The polymer particles may also be separated from the water by centrifuge and then allowed to dry. These powders may be formulated into coating compositions also. Pigments, when desired may be incorporatd in the powders by dispersing the pigments in the dispersions prior to removing the water. This method has been found to be quite reliable but other methods known in the art may also be used. Other conventional paint additives may be included in these compositions also, for example, fillers, resins, dyes and the like. The powders obtained do not agglomerate during storage. The particles sinter readily and flow easily at operating temperatures. The resultant coatings are tough and durable.

The particle size of the powder obtained from the emulsions may vary from 0.5 $\mu$m to 250 $\mu$m diameter depending on the particular intended use. For example, if the powder is to be used as an electrostatic spray powder, the particle size may range from 10 $\mu$m to 40 $\mu$m diameter. Where the powder is to be employed in a fluidized bed, the particle size will vary from 40 $\mu$m to 80 $\mu$m diameter.

The modified thermosettable addition polymers of this invention in aqueous dispersion or dry particulate form may be used as adhesives, moulding compounds and as coatings particularly for glass and steel substrates to which they show outstanding adhesion. When used as coatings, the compositions may be applied to substrates according to conventional methods, e.g. by dipping, rolling and the like, or they may be used in electrophoteric coatings systems, electrostatic spray powder coatings systems and fluidized bed coatings systems depending on the form of the compositions and substrates.

The modified polymers of the present invention have been found to have outstanding utility in coatings for glass substrates, especially glass containers, e.g. glass bottles. The coatings when applied to the exterior surface of glass bottles protect the surface and the contents of the bottle, and may, in addition conceal the contents. Obviously, when such coatings are pigmented, one can add the desired characteristic of aesthetic appeal. If the coatings are applied so that the resulting film has a thickness of $\geq$ 0.5 mil, shatter protection is achieved. If the resulting film has a thickness <0.5 mil, surface lubricity is achieved. Surface lubricity facilitates the handling and processing of glass bottles, since it substantially reduces the tendency of such bottles to autoadhere, particularly during wet processing. This is a very important feature since contact of this nature between bottles during processing reduces the life of such bottles by a factor of at least one-third. The coatings may be applied to the glass containers during their manufacture when they have cooled to an appropriate temperature. Alternatively, they may be applied to re-heated bottles. Not only are the above advantages derived, but also the coatings may be applied in the form of aqueous dispersions or dry powders without the use of flammable, highly volatile organic solvents.

In addition to the above specific utility, the coatings of this invention have been found to be very useful as coatings for metal containers, e.g. tin-free steel from which food cans are formed. The cans are formed from pre-coated metal sheets, usually so that the coated surface forms the interior thereof. The adhesive characteristics of these compositions when applied to the metal substrates are such that, the seaming and sealing of the cans may be effected with the compositions of this invention, without the use of conventionally known seam sealing compositions. This represents substantial savings in both the processing and material costs. The coatings may of course be applied according to any of the above-described methods. Again, they offer the very attractive safety feature of requiring no flammable solvents for application.

Another use of the thermosettable aqueous dispersions of this invention is as fiberglass mat binder resins.

One particularly useful advantage of the coatings of this invention is that they exhibit the property of reflow. i.e., the coatings may be applied to substrates and baked, then sanded with fine grit paper to a flat, low gloss, abraded surface and after another baking will be restored to a high gloss, smooth surface. Thus the present coating compositions have particular applications as commercial automotive finishes. It should be noted that where a coating composition is to be used in reflow systems, the intrinsic viscosity $[\eta]$ of the polymer dispersion should preferably not exceed 0.5 dl.g.$^{-1}$.

An example of the non-reactive modifiers which are low molecular weight polyesters and was used in the following Examples with the reactive modifier is an adipic acid/diethylene glycol/benzyl alcohol polyester which was prepared as follows:

A charge of 292 g. of adipic acid, 106 g. of diethylene glycol and 25 g. of toluene was placed in a flask equipped with a stirrer, a reflux condenser, a water separator, a thermometer and a means of heating. The batch was heated over a temperature range of 160° to 180°C. while about 36 g. of water were collected and an acid number of 310 (milliequivalents KOH per gram) attained. An excess of benzyl alcohol was then added (300 g.) and water was taken off to a batch temperature of 240°C. When an acid number of 1 to 2 was attained, excess benzyl alcohol (about 80 g.) was removed. The polyester was a straw yellow mobile liquid.

The present invention is illustrated by the following Examples which describe various embodiments thereof. All parts, percentages and ratios are by weight unless otherwise specified.

with the complementary reactive groups located in different layers of the particles.

Examples 29 to 59 illustrate the process of this invention wherein the resulting polymer particles contain the non-reactive or reactive modifier or modifiers substantially uniformly distributed throughout their depth.

Examples 60 to 64 illustrate the process of this invention wherein the aqueous dispersion is in the form of a suspension and the resulting polymer particles contain the reactive or non-reactive modifier substantially uniformly distributed throughout their depth.

In these Examples, the hydroxyethyl cellulose may be "Natrosol" 250 HR (Trademark). The number 250 refers to the degree of substitution of hydroxyl and the HR refers to high viscosity and rapid dissolving. The polyvinyl alcohol may be "Gelvatol" 20-60, "Gelvatol" 20-90 or "Elvanol" 52-22 ("Gelvatol" and "Elvanol" are Trademarks). The numbers associated with the Trademarks indicate different molecular weights.

Examples 65 to 78 illustrate the process of this invention Examples 69 to 78 illustrate the process using an ionic monomer as principal stabilizing material.

Examples 1 to 28 illustrate the process of this invention wherein the resulting polymer particles are formed

EXAMPLE 1

| Charge No. | Ingredients | Parts | Operation |
|---|---|---|---|
| 1 | Sodium alkyl aryl polyether sulphonate (28% solids solution) | 3.6 | |
| | Water | 100.0 | Charged to flask |
| | Sodium persulphate | 1.0 | Heated to 92°C. |
| | Sodium bicarbonate | 1.0 | |
| 2 | Styrene | 180 | |
| | Butyl acrylate | 120 | Emulsified by stirring |
| | Methacrylic acid | 37.5 | Added over 2.5 hours. Held ½ hour. Cooled to 80°C. |
| | Adipic acid/diethylene glycol/benzyl alcohol plasticizer | 45 | |
| | Water | 350 | |
| | Sodium alkyl aryl polyether sulphonate (28% solids solution) | 15 | |
| | 1-octanethiol | 0.25 | |
| | Sodium persulphate | 1.0 | |
| 3 | Styrene | 48 | |
| | Butyl acrylate | 32 | Emulsified and added over 1 hour at 80°C. Held 10 minutes |
| | "Epon" 826 | 43.5 | |
| | "Benax" 2 Al | 3.0 | |
| | "Igepal" CO 730 | 0.5 | |
| | Water | 140.0 | |
| | 1-Octanethiol | 0.25 | |
| | Sodium persulphate | 0.25 | |
| 4 | Styrene | 10.7 | |
| | Butyl acrylate | 7.3 | Added over ½ hr. Held 1 hour. Cooled to 40° C. |
| | "Benax" 2 Al | 1.0 | |
| | Water | 20.0 | |
| | Sodium persulphate | 0.1 | |

EXAMPLE 2

Styrene/butylacrylate/methacrylic acid/epoxy resin (64.4/27.6/8.0/3.7)

| Charge No. | Ingredients | Parts | Operation |
|---|---|---|---|
| 1 | Sodium alkyl aryl polyether sulphonate (28% solids solution) | 3.6 | |
| | Water | 100.0 | |
| | Sodium persulphate | 1.0 | |
| | Sodium bicarbonate | 1.0 | |
| 2 | Styrene | 258 | |
| | Butyl acrylate | 110 | |

| Charge No. | Ingredients | Parts | Operation |
|---|---|---|---|
| | -continued | | |
| | Methacrylic acid | 40 | |
| | Water | 400 | |
| | Sodium alkyl aryl polyether sulphonate (28% solids solution) | 15 | Stirred vigorously to emulsified state |
| | Sodium persulphate | 1.0 | |
| | 1-Octanethiol | 0.75 | |
| 3 | Styrene | 51.5 | |
| | Butyl acrylate | 22.1 | |
| | "Epon" 826 | 18.5 | "Epon" dissolved |
| | "Benax" 2 A1 | 3.0 | in monomers, water and surfactants |
| | "Igepal" CO 730 | 0.5 | then added. Stirred to emulsified state |
| | Water | 100 | |
| | Sodium persulphate | 0.25 | |
| | 1-Octanethiol | 0.25 | |
| 4 | Styrene | 12.9 | |
| | Butyl acrylate | 5.5 | Stirred to emulsified state |
| | "Benax" 2 A1 | 1.0 | |
| | Water | 32 | |
| | Sodium persulphate | 0.1 | |

Charge No. 1 was heated to 92°C. and pre-emulsified Charge No. 2 was added over 3 hours. The temperature was maintained at 90°C. and the whole was held for 30 minutes. The whole was then cooled to 80°C. Pre-emulsified Charge No. 3 was added over 1 hour and the whole held for 30 minutes. Charge No. 4 was added over 15 minutes. The whole was held at 80°C. for 2 hours during which 2 additions of 0.25 g. of sodium persulphate in 5 g. of water were added at 30 minutes interval. Solids 44.5%. Conversion 99%.

Using the same monomer proportions of Example 2, the polymer dispersions listed in the following Table I were prepared. As the level of epoxy resin was increased, the quantity of water was also increased in order to keep the solids equivalent, for example at an epoxy resin level of 18.6%. "Epon" 826 in Charge No. 3 was 93.0 g and water was 190 g.

TABLE I

| Ex. No. | "Epon" Level (% on polymer solids) | Polyester* Level | Solids % | Reduced Viscosity dl./g. | Concentration g./dl. | MFT °F. |
|---|---|---|---|---|---|---|
| 3 | 3.7 | 0 | 44.5 | 0.42 | 0.51 | 150 |
| 4 | 4.65 | 0 | 44.4 | 0.45 | 0.45 | 150 |
| 5 | 6.2 | 0 | 44.1 | 0.43 | 0.50 | 140 |
| 6 | 9.3 | 0 | 43.9 | 0.40 | 0.52 | 125 |
| 7 | 18.6 | 0 | 44.0 | 0.36 | 0.52 | 100 |
| 8 | 6.2 | 6.0 | 44.3 | 0.37 | 0.53 | 110 |
| 9 | 9.3 | 6.0 | 44.1 | 0.36 | 0.50 | 100 |
| 10 | 18.6 | 6.0 | 43.9 | 0.35 | 0.51 | 78 |
| 11 | 6.2 | 12.0 | 43.7 | 0.29 | 0.51 | 78 |
| 12 | 9.3 | 12.0 | 43.9 | 0.29 | 0.52 | 75 |
| 13 | 18.6 | 12.0 | 43.9 | 0.30 | 0.52 | 73 |

*Adipic acid/diethylene glycol/benzyl alcohol polyester.
MFT = minimum filming temperature using thermal gradient bar operating between 150 – 73°F.

From Table I it can be seen that the epoxy resin can be used as a plasticizer with respect to low temperature coalescence of latex particles. However, the polyester is about 50% more efficient than the epoxy resin in depressing MFT.

If there are some signs of latex instability noted on extended storage, small additions of a base e.g. monoethanolamine, sufficient to neutralize 5–10% of the total acid in polymer serve to stabilize the latex. This may be encountered at high levels of epoxy resin and/or polyester plasticizers.

In the following Table II there are disclosed examples of non-pigmented films using polymer dispersions prepared according to the present invention.

TABLE II

| Ex. No. | Non-pigmented Films Composition (parts) | Chain Transfer Agent | Adhesion to Glass | Water* Resistance |
|---|---|---|---|---|
| 14 | MMA/BA/"Epon"826/MA (49.0/38.8/6.6/5.6) | 10% dipropylene glycol monomethyl ether | excellent | no damage or softening |
| 15 | MMA/BA/"Epon"826/MA/Plasticizer (58.7/25.0/6.3/5.4/4.6) | '' | '' | '' |
| 16 | MMA/BA/"Epon"826/MA (49.0/38.8/6.6/5.6) | '' | '' | '' |
| 17 | S/BA/"Epon"826/MA (49.0/38.8/6.6/5.6) | '' | '' | '' |
| 18 | S/MMA/BA/"Epon"826/MA (36.8/12.2/6.6/5.6) | '' | '' | '' |
| 19 | S/BA/"Epon"826/MA/Plasticizer (57.2/24.4/8.7/5.3/4.4) | '' | '' | '' |
| 20 | S/BA/"Epon"826/MA/Plasticizer | | | no damage, water-marking |

TABLE II-continued

| Ex. No. | Non-pigmented Films Composition (parts) | Chain Transfer Agent | Adhesion to Glass | Water* Resistance |
|---|---|---|---|---|
| | (54.5/23.2/8.2/10.0/4.1) | " | " | or loss of adhesion |
| 21 | S/BA/AAm/"Epon"826/MA/Plasticizer (56.5/24.0/1.7/8.5/5.0/4.3) | " | " | |
| 22 | S/BA/"Epon"826/MA/MAAm/Plasticizer (55.0/23.3/8.5/5.0/4.1/4.1) | " | good | |
| 23 | S/BA/"Epon"826/"Carbowax"1500/Plasticizer (55.0/23.3/8.5/5.0/4.1/4.1) | " | " | |
| 24 | S/BA/"Epon"826/MA/Plasticizer (38.7/38.7/10.0/8.4/4.1) | " | " | slight softening occurred |
| 25** | MMA/BA/GMA/MA/Plasticizer (75.0/8.5/2.2/3.3/11.0) | " | fair | no damage |
| 26 | MMA/BA/"Epon"826/MA/Plasticizer (70.0/10.6/1.0/3.0/15.4) | " | poor | no damage, some seepage through scratched areas |
| 27 | MMA/BA/"Epon"826/MA (64.0/26.8/4.8/4.4) | " | excellent | |
| 28 | S/BA/"Epon"826/MA/Plasticizer (61.5/26.3/4.7/2.8/4.7) | 0.2% on monomers Mercapto succinic acid | " | |

*12 hours at room temperature
**Fourth charge not used, i.e. no mop-up charge to end polymerization
S = Styrene
MMA = Methyl methacrylate
BA = Butyl acrylate
MA = Methacrylic acid
AAm = Acrylamide
MAAm = Methacrylamide
GMA = Glycidyl methacrylate
Plasticizer = adipic acid/diethylene glycol/benzyl alcohol polyester

EXAMPLE 29

Copolymer of Styrene/Butyl acrylate/Methacrylic acid/"Epon" 826 in 39.3/45.1/5.9/9.7 Ratio Method I - "Emulsified monomer feed" process a. An initial charge of 2.0 parts of "Benax" 2 Al (45%), 0.66 part of "Igepal" CO 730, 100.0 parts of water, 1 part of sodium persulphate and 1 part of sodium bicarbonate was added and heated to 80° to 90°C. in a flask equipped with stirrer, reflux condenser, addition tube and means of heating or cooling. An emulsified monomer feed consisting of 202.5 parts of styrene, 232.5 parts of butyl acrylate, 30 parts of methacrylic acid, 50 g. of "Epon" 826, 480 parts of water, 9.3 parts "Benax" 2 Al, 2.8 parts of "Igepal" CO 730 and 1 part of sodium persulphate was prepared by vigorous agitation of the feed. The emulsified feed was kept agitated using a stirring device and was added over a period of 3 hours. At the end of this addition, the temperature was maintained at 90°C. for 15 minutes and then 0.5 g. of sodium persulphate and 10.0 g. of water were added. The whole was then held for a further 30 minutes. An aqueous dispersion was obtainable with solids 45.3% and conversion 97%.

In order for the resulting dispersion to form a film at room temperature (75°F.) about 10% of dipropylene glycol monomethyl ether or diethylene glycol monobutyl ether may be added as a 50% solution to the partly neutralized (30%) dispersion.

b. A similar copolymer of styrene/butyl acrylate/methacrylic acid/"Epon" 826 in 37.9/47.0/5.7/9.4 ratio prepared at 80°C. throughout gave 99% conversion and filmed easily at room temperature.

Method II — "Monomer feed" process

Using the same total charge as used in Method I all of the water-soluble components, emulsifier and water were charged to the flask and heated to 90°C. Half of the persulphate was dissolved in water to give a 3% solution and held back. The monomers and modifier were then added according to the rates used in Method I. The persulphate solution was added separately during the final 3 hours of addition only.

Method III — "Modifier seed" process

This process was similar to Method II except that the modifier was added to the aqueous charge and vigorously agitated to give a milky dispersion. The additional monomers were then added as outlined in Method II.

EXAMPLE 30

Method IV — "Single feed" process

Copolymer of Methyl methacrylate/Butyl acrylate/Methacrylic acid/N-methylol acrylamide/Dibenzyl diethylene glycol diadipate polyester in 66.17/7.35/2.0/4.61/19.87 ratio.

A charge of 3.6 parts of sodium alkyl aryl polyether sulphonate (28% solids solution), 100.0 parts of water, 1.0 part of sodium persulphate and 1.0 part of sodium bicarbonate was heated to 92°C. An emulsion of 10 parts of methacrylic acid, 333 parts of methyl methacrylate, 37 parts of butyl acrylate, 100 parts of the polyester, 28 parts of N-methylol acrylamide, 20 parts of sodium alkyl aryl polyether sulphonate (28% solids solution), 432 parts of water, 1 part of sodium persulphate and 25 parts of dipropylene glycol monomethyl ether was added over 2 hours. The dispersion thickened towards the end of this addition and so an extra 165 parts of water were aadded and the whole was held for ½ hour. Then as catalyst 1.3 g. of monoethanolamine dissolved in 20 g. of water was added.

The resulting latex was made up into a paint using enough latex to give solids of 46 g. with 40 g. (based on water/dipropylene glycol monometyl ether 80/20) of 66% white tinter. The paint was sprayed at 46½% solids on black dip primed panel and zinc phosphated steel. The film was subjected to a 10 minute flash (air dry) followed by a 30 minute bake at 300°F.

The film obtained had a high gloss (60%), and excellent condensing humidity resistance at 150°F. After a 10 hour bake at 140°F. reflow was possible and sanding with 600 paper was satisfactory. No reflow was possible after 15 hours at 250°F.

The N-methylol acrylamide was prepared as outlined below following the method described in U.S. Pat. No. 3,064,050 and Chemical Abstracts 58, 6700d.

A charge of 945 g. of paraform (91% solid polymer of formaldehyde), 620 g. of water and 20 g. of triethylamine was placed in a flask and heated to 100°C., for 2 hours.

A further charge of 0.4 g. of cupferron (ammonium salt of N-nitroso N-phenylhydroxylamine), 23.0 g. of triethylamine and 2310.0 g. of acrylamide (95%) was added and the temperature was decreased to 50°C. The temperature was then maintained at 50°C. and held for 2 hours.

EXAMPLE 31

Method IV — "Single feed" process

Copolymer of Methyl methacrylate/Butyl acrylate/Methacrylic acid/Dibenzyl diethylene glycol diadipate polyester/Hydroxymethyl diacetone acrylamide in 67.84/7.42/3.09/20.62/1.03.

A charge of 3.6 parts of sodium salt of alkyl aryl polyether sulphonate (28% solids solution), 100.0 parts of water, 1.0 part of sodium persulphate, 1.0 part of sodium bicarbonate was heated to 80°C. An emulsion of 329.0 parts of methyl methacrylate, 36.0 parts of butyl acrylate, 15.0 parts of methacrylic acid, 100.0 parts of dibenzyl diethylene glycol diadipate polyester modifier, 5.0 parts of hydroxymethyl diacetone acrylamide, 384.0 parts of water, 48.0 parts of dipropylene glycol monomethyl ether and 1.0 part of sodium persulphate was then added over a period of 3 hours. The whole was held for 30 minutes and then a catalyst of 3.0 g. of monoethanol amine dissolved in 20.0 g. of water was added.

The resulting latex was made up into a paint exactly as described in Example 30 and then the paint was sprayed at 46.5% by weight solids on black dip primed panel and zinc phosphated steel. The resulting film possessed the characteristics described for the film in Example 30.

In the following Tables III, IV and V, there are further examples of polymers prepared according to the methods of this invention.

TABLE III

| | | | Method I - "Emulsified feed" process | | | | |
|---|---|---|---|---|---|---|---|
| Example No. | Main Monomers MMA/BA % | Reactive Monomer MA % | Reactive Modifier | % | Surface Active Substance | chain Transfer Agent U/M % | Minimum Film-Forming Temperature °F. |
| 32 | 90/10 | 6.0 | "Genepoxy" M205 | 20.0 | "Triton" X-200 | | 110 |
| 33 | 90/10 | 6.0 | "Epon" 812 | 20.0 | "Triton" X-200 | 7.5 U | 130 |
| 34 | 46.5/53.5 | 5.8 | "Epon" 828 | 9.7 | "Benax" 2 Al/ "Igepal" CO 730 | | Room temperature |
| 35 | 50/50 | 5.5 | "Epon" 812 | 9.1 | "Benax" 2 Al/ "Igepal" 710 | | 75 |
| 36 | 46.5/53.5 | 5.8 | "Epon" 826 | 9.7 | "Benax" 2 Al/ "Igepal" CO 730 | | Room temperature |

MMA/BA = Methyl methacrylate/Butyl acrylate

MA = Methacrylic acid

U = Dipropylene glycol monomethyl ether (% of water in feed)

M = Primary octyl mercaptan (% of monomers)

TABLE IV

| | | | Method III — "Modifier seed" process | | | | |
|---|---|---|---|---|---|---|---|
| Example No. | Main Monomers S/BA % | Reactive Monomer MA % | Reactive Modifier | % | Surface Active Substance | Chain Transfer Agent U/M % | Minimum Film-Forming Temperature °F. |
| 37 | 46.5/53.5 | 5.8 | "Genepoxy" M205 | 9.7 | "Benax" 2 Al/ "Igepal" CO 730 | | Room temperature |

S/BA = Styrene/Butyl acrylate

MA = Methacrylic acid

U = Dipropylene glycol monomethyl ether (% of water in feed)

M = Primary octyl mercaptan (% of monomers)

TABLE V

| | | Method IV - "Single feed" process | | | |
|---|---|---|---|---|---|
| Example No. | Copolymer | Reactive Modifier | % | Adhesion to Glass | Caustic-Detergent* Resistance |
| 38 | Methyl methacrylate/ Butyl acrylate/Methacrylic acid 39.2/45.0/5.8 | "Epon" 828 | 10.0 | excellent | lost adhesion |
| 39 | Styrene/Butyl acrylate/ Methacrylic acid 39.2/45.0/5.8 | "Epon" 826 | 10.0 | excellent | slight softening occurred |

*30 minutes at 150°F. in a 4% NaOH +Na₃PO₄ solution

In the following Examples 40 to 44 there is illustrated the use of the "Monomer feed" process.

EXAMPLE 40

(Reactive Modifier)

Styrene/Butyl acrylate/Methacrylic acid/"Epon" 826 in 46.5/46.5/2.0/5.0 ratio. A first charge comprising 3.6 parts of "Triton" X 200, 660.0 parts of water, 1.0 part of sodium persulphate and 1.0 part of sodium bicarbonate was added to flask equipped with stirrer, reflux condenser and heating mantle; and was heated to 80°–85°C. A slightly opalescent solution of a second charge comprising 251.0 parts of styrene, 251.0 parts of butyl acrylate, 11.0 parts of methacrylic acid, 27.0 parts of "Epon" 826, 10.7 parts of "Triton" X200 and 6.7 parts of "Benax" 2 Al (45%) was added to the initial charge over a 2 to 3 hour period using a metering pump at the rate of 100 ml/hr. for the first 30 minutes. Suspension of the surfactants was maintained by stirring the second charge slowly throughout addition. Thirty minutes after addition, 5 ml. of a 2% solution of sodium metabisulphite and a few drops of t-butyl hydroperoxide were added to the latex to ensure complete reaction. A stable, blue-white latex with total solids 43.6% was obtained.

EXAMPLE 41

(Reactive Modifier)

Methyl methacrylate/Butyl acrylate/Methacrylic acid/"Epon" 812 in 46.5/46.5/2.0/5.0 ratio.

A first charge comprising 3.6 parts of "Triton" X 200, 660.0 parts of water, 1.0 part of sodium persulphate and 1.0 part of sodium bicarbonate was added to a flask equipped with stirrer, reflux condenser and heating mantle, and was heated to 80° – 85°C. A slightly opalescent solution of a second charge comprising 251.0 parts of methyl methacrylate, 251.0 parts of butyl acrylate, 11.0 parts of methacrylic acid, 27.0 parts of "Epon" 812 and a pre-dissolved mixture of 10.7 parts of "Triton" X 200, 6.7 parts of "Benax" 2 Al (45%) and 1.0 part of sodium persulphate was added to the initial charge over a 2 to 3 hour period using a metering pump at the rate of 100 ml/hr. for the first 30 minutes. Suspension of the surfactants was maintained by stirring the second charge slowly throughout addition. 30 minutes after addition, 5 ml. of a 2% solution of sodium metabisulphite and a few drops of t-butyl hydroperoxide were added to the latex to ensure complete reaction. A stable blue-white latex with total solids 42.1% and having a slight amount of coagulum was obtained.

EXAMPLE 42

(Non-reactive Modifier and Reactive Modifier)

Methyl methacrylate/Butyl acrylate/Methacrylic acid/Dibenzyl diethylene glycol diadipate polyester plasticizer/"Epon" 826 in 69.5/8.7/4.4/8.7/8.7 ratio.

A first charge comprising 3.6 parts of "Triton" X 200, 666.0 parts of water, 1.0 part of sodium persulphate and 1.0 part of sodium bicarbonate was added to a flask equipped with stirrer, reflux condenser and heating mantle, and was heated to 80° – 85°C. A slightly opalescent solution of a second charge comprising 375 parts of methyl methacrylate, 46 parts of butyl acrylate, 24 parts of methacrylic acid, 46.0 parts of the plasticizer and 46.0 parts of "Epon" 826 and a pre-dissolved mixture of 10.7 parts of "Triton" X 200, 6.7 parts of "Benax" 2 Al and 1.0 part of sodium persulphate was added to the charge over a 2 to 3 hour period using a metering pump at the rate of 100 ml./hr. for the first 30 minutes. Suspension of the surfactants was maintained by stirring the second charge slowly throughout the addition. 30 minutes after addition, 5 ml. of a 2% solution of sodium metabisulphite and a few drops of t-butyl hydroperoxide were added to the latex to ensure complete reaction. A stable yellow-white latex, with total solids 40.3% having a fair amount of coagulum was obtained.

EXAMPLE 43

(Non-reactive Modifier and Reactive Modifier)

Styrene/Butyl acrylate/Methacrylic acid/Dibenzyl diethylene glycol diadipate polyester plasticizer/"Epon" 812 in 69.5/8.7/4.4/8.7/8.7 ratio.

Following the procedure outlined in Example 14 and substituting styrene for methyl methacrylate, there was obtained a yellow-white latex total solids 40.3% having a fair amount of coagulum.

EXAMPLE 44

(Reactive Modifier)

Methyl methacrylate/Butyl acrylate/Acrylamide/"Uformite" MM83 in 76.42/9.25/5.00/9.33 ratio (100 solids basis). A first charge comprising 3.6 parts of "Triton"X200, 610.0 parts of water, 1.0 part of sodium persulphite and 3.0 parts of sodium bicarbonate was heated to 90°–94°C. in a flask equipped with stirrer, reflux condenser and heating mantle. A second charge comprising 27.0 parts of acrylamide and 25.0 parts of water, and a third charge comprising 413.0 parts of methyl methacrylate, 50.0 parts of butyl acrylate, 63.0 parts (80% solution in isopropanol of "Uformite" MM83 (Trade Mark for melamine-formaldehyde resin) and a pre-dissolved mixture of 10.7 parts of "Triton"X200, 6.7 parts of "Benax" 2 Al and 1.0 part of sodium persulphate were added to the initial charge by a metering pump over 3 to 4 hours and then the whole mixture was held for 30 minutes. Thus there was obtained a very viscous latex with 42.0% total solids. To promote the stability of the latex, 10 to 15 g. concentrated ammonia solution was added.

In the following Table VI, there are listed properties of films prepared from some of the latices of the previous Examples.

TABLE VI

| Example No. | Conversion % | RV*/(Conc.) dl/g.(%) | [η]* dl/g. | Minimum Film-forming Temp.°F. |
|---|---|---|---|---|
| 41 | 97 | 0.57(1.00) | 0.48 | 70°F. |
| 42 | 94 | 2.75(1.11) | 1.48 | 70°F. |
| 43 | 94 | 0.69(1.03) | 0.57 | >150°F. |
| 44 | 90 | | | >150°F. |
| 45 | 90 | | | >150°F. |

*Solution in dimethylformamide

In the following Example 45 to 51 of Table VII there are listed further Examples of polymers obtained by the process of the present invention.

In the following Table VIII are the results of detergent resistance studies on various films formed from polymer compositions of the present invention. The films studied were applied to glass panels and baked 30 minutes at 300°F.

TABLE VII

| Example No. | Main Monomers S/BA % | Reactive Monomer MA/AAm % | "Epon" 826 | Dibenzyldiethylene glycol diadipate polyester % | "Cardura" E | Minimum Film-forming temperature °F. |
|---|---|---|---|---|---|---|
| 45 | 57.9/24.6 | 3.1/2.0 | 7.2 | 5.2 | — | 80 |
| 46 | 56.8/24.2 | 4.7/2.0 | 7.2 | 5.1 | — | 80 |
| 47 | 38.8/38.8 | 10.0/0.0 | 8.3 | 4.1 | — | 75 |
| 48 | 58.7/6.1 | 6.1/1.8 | 8.5 | 9.1 | 7.5 | 85 |
| 49 | 53.3/22.9 | 9.8/1.7 | 8.3 | 4.0 | — | 93 |
| 50 | 40.7/40.7 | 6.5/0.0 | 7.8 | 4.3 | — | 75 |
| 51 | 47.8/31.8 | 7.4/0.0 | 4.0 | 9.0 | — | 75 |

S/BA = Styrene/Butyl acrylate
MA/AAm = Methacrylic acid/Acrylamide

TABLE VIII

| Example No. | Composition | ASTM D2248-64T 24 hours | 216 hours exposure |
|---|---|---|---|
| 52 | S/BA/MA/AA/"Epon" 828 (39/45/3/3/10) | no blisters | no loss of gloss/few small blisters |
| 53 | S/BA/MA/AA/"Epon" 828 (59/25/3/3/10) | no blisters | no loss of gloss/no blisters |
| 54 | MMA/BA/MA/"Epon" 828 (39/45/6/10) | no blisters | no loss of gloss/few small blisters |
| 55 | S/BA/MA/"Epon" 826 (39/45/6/10) | no blisters | no loss of gloss/some adhesion loss |
| 56 | MMA/BA/MA/N-MyAAm/Plasticizer (66.7/7.35/2.0/4.61/19.87) | severe blisters | — |
| 57 | MMA/BA/MA/Plasticizer (70/7/3/20) | film disintegrated | — |

S = Styrene
BA = Butyl acrylate
MA = Methacrylic acid
AA = Acrylic acid
MMA = Methyl methacrylate
N-MyAAm = N-Methylolacrylamide
Plasticizer = dibenzyl diethylene glycol diadipate polyester

EXAMPLE 58

Paint formulation

The latex of Example 52, Table VIII (S/BA/MA/AA/"Epon"828 39/45/3/3/10) was pigmented with titanium dioxide in proportions of pigment/binder about 60/100. The resulting paint formulation contained about 3% of dipropylene glycol monomethyl ether as coalescing aid. The paint was coated on two substrates, Bonderite 37 and Bonderite 1000, and baked for 30 minutes at 300°F. In the following Table IX application, mechanical and resistance properties on the two substrates are reported.

TABLE IX

| Properties | Rating Bonderite 37 | Rating Bonderite 1000 |
|---|---|---|
| Applications solids | 51.2% | 51.2% |
| Cross hatch adhesion | excellent | excellent |
| Coin scratch adhesion | excellent | excellent |
| Gloss % 60° | 79 | 75 |
| 20° | 36 | 33 |
| Appearance | slightly pinched | yellower than B37 |
| Application | | |
| - break-up | good | good |
| - sag resistance | good | good |
| Mandrel bend | no cracks | few cracks |
| Impact resistance | | |
| 10 lbs | cracks, 40% removal with tape | cracks, 30% removal with tape |
| 20 lbs | cracks, 40% removal with tape | cracks, 40% removal with tape |
| 40 lbs | cracks, 60% removal with tape | cracks, 60% removal with tape |
| 60 lbs | cracks, 100% removal with tape | cracks, 100% removal with tape |
| Solvent resistance | | |
| - acetone | film softened | film softened |
| - toluene | film softened film softened | |
| - xylene | film softened | film softened |
| - methyl ethyl ketone | film softened | film softened |
| Overbake resistance (30" at 300°F.) | excellent | excellent |
| Intercoat adhesion (unsanded) | excellent | excellent |
| Stain resistance - orange dye | poor | poor |

EXAMPLE 59

Copolymer of Styrene/Butyl acrylate/Methacrylic acid/Hexamethoxy hexamethylol melamine/Dibenzyl diethylene glycol diadipate polyester in 57.4/24.4/5.2/8.7/4.3 ratio.

| Charge | Composition | Grams |
|---|---|---|
| A | Sodium alkyl aryl polyether sulphonate (28% solids solution) | 3.6 |
| | Water | 100.0 |
| | Sodium persulphate | 1.0 |
| | Sodium bicarbonate | 1.0 |
| B | Styrene | 230.0 |
| | Butyl acrylate | 101.0 |
| | Methacrylic acid | 30.0 |
| | Dibenzyl diethylene glycol diadipic acid polyester | 25.0 |
| | Water | 354.0 |
| | Dipropylene glycol monomethyl ether | 37.0 |
| | Sodium alkyl aryl polyether sulphonate (28% solids solution) | 15.0 |
| | Sodium persulphate | 1.0 |
| | 1-Octanethiol | 0.25 ml. |
| C | Styrene | 79.0 |
| | Butyl acrylate | 34.0 |
| | Hexamethoxy hexamethylol melamine 100% | 50.0 |

-continued

| Charge | Composition | Grams |
|---|---|---|
| | Ammonia 29% | 15.0 |
| | Sodium dodecyl diphenyl ether disulphate | 3.0 |
| | Nonylphenoxy polyethylenoxy ethanol | 0.5 |
| | Water | 128.0 |
| C | Dipropylene glycol monomethyl ether | 11.0 |
| | Sodium persulphate | 0.1 |
| | 1-Octanethiol | 0.25 ml. |
| D | Styrene | 20.0 |
| | Butyl acrylate | 5.0 |
| | Sodium dodecyl diphenyl ether disulphonate | 1.0 |
| | Water | 25.0 |
| | Sodium persulphate | 0.1 |

Charge A was placed in a reaction vessel and heated to 90°–95°C. Charge B was emulsified and added to the reaction vessel over 4 hours. The system was cooled to 80°C. and then Charge C, emulsified, was added over 45 minutes. The system was held for 10 minutes and Charge D was added over 15 minutes. The system was then held 1 hour and then 10 ml. of a 10% solution of sodium persulphate was added. The system was held for a further 1 hour and then 1.0 g. of monoethanolamine in 10.0 g. of water was added. Total solids 40.1%. Conversion 90%. Intrinsic viscosity at 25°C. in ethylene/dichloride/ethanol 95/5 = 0.38 dl.g.$^{-1}$. Minimum film-forming temperature 65°F.

The resin was cured at 300°F. for 30 minutes to give a tough finish, resistant to acetone and xylene with excellent adhesion to phosphated steel and glass. It would appear that the use of the "Single feed" addition process of melamine formaldehyde resin is not so successful as coagulation tends to occur.

The addition of the ammonia in Charge C of this last example seems to be most desirable to avoid coagulation without excessive thickening.

In place of hexamethoxy hexamethylol melamine, butylated melamine formaldehyde resin (melamine/formaldehyde = 1/5.5) 60% solids in xylene. Petroleum ether dilution tolerance of 4.0 (using British Drug House Petroleum Ether boiling range 100° – 120°C.) may be used with substantially the same success.

EXAMPLE 60

Copolymer of Methyl methacrylate/Butyl acrylate/Methacrylic acid/"Epon" 1004 modifier in ratio 70.9/8.3/4.1/16.7

| Charge | Composition | Grams |
|---|---|---|
| A | Methyl methacrylate | 170.0 |
| | Butyl acrylate | 20.0 |
| | Methacrylic acid | 10.0 |
| | "Epon" 1004 (Bisphenol A-Epichlorhydrin condensate, epoxy equivalent 950) | 40.0 |
| B | Water | 400.0 |
| | Hydroxyethyl cellulose | 0.8 |
| | Partially hydrolyzed polyvinyl acetate - 7½% aqueous solution | 13.5 |
| | Antifoam | 0.1 |

Charge A was prepared by dissolving the "Epon" 1004 in the monomers with warming at a temperature of no more than 40°C. The solution was then cooled to room temperature and 4.0 g. of benzoyl peroxide were dissolved in the mixture. Charge A was added to a solution of Charge B, using a Cowles agitator at 2,500 rpm for 60 seconds. Then 400 g. of water were added at 1000 rpm. The whole was transferred to a jacketed pot and heated with stirring to 80°C. and held for 3 hours. It was then allowed to cool, settle and then the beads were decanted. The beads were washed until the supernatant was clear. The yield was 233 g. of beads of diameter 30 to 400 μm. Intrinsic viscosity in ethylene dichloride/ethanol 95/5 at 25°C. was 0.85 dl. g.$^{-1}$.

A small amount of polymer was obtained with a particle size of 0.5 to 2.0 μm representing about 3% of the monomers charged.

EXAMPLE 61

Styrene/Butyl acrylate/Methacrylic acid/"Epon" 1001 in ratio 77.3/9.1/4.5/9.1.

A solution of a first charge comprising 400.0 parts of water, 0.8 part of hydroxyethyl cellulose and 13.5 parts of a 7½% by weight solution of polyvinyl alcohol was prepared with stirring for 30 minutes using 1 to 2 drops of antifoam agent. A solution of a second charge comprising 170.0 parts of styrene, 20.0 parts of butyl acrylate, 10.0 parts of methacrylic acid, 20.0 parts of "Epon" 1001 and 4.0 parts of benzoyl peroxide was prepared and added to the solution of the first charge using a 2 inch Cowles Dissolver at 1000 rpm for 2 minutes. The combined solutions were then transferred to a jacketed vessel and heated to 180°F. using gentle agitation. Then 200 g. of water were added and heating was continued slowly over 3 hours to 212°F. The whole was allowed to cool to 100°F., allowed to settle and then the supernatant liquid decanted and the polymer beads washed. Dry beads of about 500 μm diameter were recovered having a total weight of 190 g. Their softening point on a thermal gradient bar was 110° – 125°C.

EXAMPLE 62

Styrene/Methacrylic acid/"Epon" 826 in ratio 90.5/4.75/4.75.

A solution of a first charge comprising 440 parts of water, 1.0 part of hydroxyethyl cellulose, 15.0 parts of a 7.5% solution of polyvinyl alcohol was prepared with stirring to give complete solution and transferred to a jacketed vessel. A second charge comprising 380.0 parts of styrene, 20.0 parts of methacrylic acid, 20.0 parts of "Epon" 826 and 8.0 parts of benzoyl peroxide was added to the vessel using the vessel agitator (3 inches long × ¾ inch depth "half-moon" blade) at 500 rpm for 3 minutes. Then 150 g. of water was added and the mix heated to a gentle reflux, starting at 170°F. and after 2½ hours attaining a temperature of 204°F. After a further 30 minutes, the batch was cooled to 100°F., allowed to settle, the supernatant was decanted and the beads were washed. Beads weighing 380 g. of size 60 to 250 μ m were obtained. Some 400 g. of latex like material were also produced. About 10 g. of beads of size about 10 μm were obtained from this latex.

EXAMPLE 63

Example 62 was repeated on a larger scale (2½ times larger). The final product was recovered by filtration through a 10 μm viscose filter bag and washed while in the bag. The powder was allowed to dry yielding 1002 g. The yield was 92% including mechanical and handling losses. The product was freely soluble in cold xylene giving a viscous solution Z$_2$ Gardner-Holdt at 40% solids and had an acid number of 32 mg. KOH/g. (Theory 33.5).

EXAMPLE 64

A sample of powder from Example 63 was mixed intimately with zinc stearate, 2% by weight on polymer. A portion, 10 g. of this mix was placed in a 2 inches aluminum dish and heated 2½ minutes at 500°F. A translucent brittle plaque was formed, which was insoluble in xylene at 80°C.

EXAMPLE 65

A series of four latices were prepared as described below with the following basic composition:

Methyl methacrylate/Butyl acrylate/Methacrylic acid/Diethylene glycol dibenzyldiadipate (plasticizer) in the weight percentages 71.3/10.6/3.0/15.

| Charge | Composition | Parts by Wt. | Operation |
|---|---|---|---|
| A | Water | 421.5 | |
| | Sodium dodecyl benzene sulphonate (5% solids solution) | 30.0 | |
| | Sodium alkyl aryl polyether sulphonate (28% solids solution) | 5.4 | Charged to a 5 l. flask |
| | Ammonium persulphate | 1.2 | |
| B | Methyl methacrylate | 855 | |
| | Butyl acrylate | 129 | A pre-emulsion |
| | Methacrylic acid | 45 | was made of |
| | Plasticizer | 225 | Charges B |
| | Dimethylethanolamine | 12 | and C |
| | Octanethiol | 4 | |
| C | Sodium dodecylbenzene sulphonate (5% solids solution) | 78 | |
| | Sodium alkyl aryl polyether sulphonate (28% solids solution) | 13.5 | |
| | Water | 924 | |
| | Ammonium persulphate | 1.5 | |
| D | Methyl methacrylate | 210 | |
| | Butyl acrylate | 30 | |
| | "Epon 828" | 0 or 15 or 30 or 45 | |
| | Octanethiol | 1.0 | A pre-emulsion was made of |
| E | Sodium dodecylbenzene sulphonate (5% solids solution) | 36 | Charges D & E |
| | Sodium alkyl aryl polyether sulphonate (28% solids solution) | 6.0 | |
| | Water | 204 | |
| | Ammonium persulphate | 0.6 | |

The pre-emulsions of B and C and D and E were added successively to Charge A over a period of 5 hours with the reaction flask being maintained at between 80° and 85°C. After the additions were complete the flask was held at 80°C. for a further ½ hour.

The four latices with varying "Epon" 828 levels were evaluated as clear films and pigmented finishes by spray application. Typical formulations are:

| | Formulations Parts by Weight | |
|---|---|---|
| | A | B |
| Latex | 110 | 110 |
| White millbase of Rutile TiO$_2$ dispersed with dimethylethanolamine | 31 | 0 |
| Dimethylethanolamine | 1 | 1 |
| Butoxy ethanol | 15 | 15 |
| Water | 15 | 15 |
| | 172 | 141 |

These formulations were spray applied to primed steel panels or non-primed bonderized steel and baked 15 minutes at 150°F. followed by 30 minutes at 300°F.

These finishes, at 2.0 – 2.2 mils thickness, were subjected to the Condensing Humidity Test as outlined by the General Motors Corporation. The results summarized below showed increasing "Epon" 828 levels resulted in increased resistance to damage by the humid conditions.

| Formulation | 1 | 2 | 3 | 4 |
|---|---|---|---|---|
| Level of "Epon" 828 (parts) | 0 | 15 | 30 | 45 |
| (% on) | | (1.0%) | (2.0%) | (3.0%) |
| Test Results | | | | |
| Whitening | Severe and permanent | Significant and permanent | Slight, but recovers overnight | slight, but recovers in a few hours |
| Loss of Gloss | yes | Slight, but rapid recovery | none | none |
| Reflow after 180°–200°F. pre-bake | yes | yes | yes | Some difficulty |
| Reflow after 300°F. Pre-bake | yes | yes | no | no |

The following two Examples illustrate the use of the thermosettable polymer dispersions of this invention as fibreglass mat binders.

EXAMPLE 66

The polymer prepared in Example 64 comprising a powder of Styrene/Methacrylic acid/"Epon" 826 was evaluated as a fibreglass mat binder in the following manner:

A 14 inches × 14 inches perforated teflon plate was placed in a mat-making machine to which a centrifugal blower was attached. A layer of 2 inches chopped glass fibres (Owens-Corning Fibreglass-chopped continuous strand - 830-2 inches) was sprinkled on the perforated plate, and a fog of water was sprayed over the glass with the blower on. The blower was switched off and 1 gram of the polymer powder was sprinkled uniformly over the mat. A second layer of fibreglass was sprinkled on the first layer and then sprayed with water mist for 30 seconds with the blower on. This process was repeated 4 times, then the so formed mat was heated in an oven at 195°C. for 20 minutes. The glass mat was cooled between 2 teflon plates and was cut into sections for testing.

EXAMPLE 67

A thermosettable aqueous polymer dispersion was prepared comprising Styrene/Butyl acrylate/Methacrylic acid) "Epon" 826 in the proportions 37.4/46.4/6/6.9/9.3.

| Charge | Composition | Parts by wt. | Operation |
|---|---|---|---|
| A | Sodium alkylaryl polyether sulphonate (28% by weight solids solution) | 13.5 | This charge was heated to 90°–95°C. |
|  | Tap water | 375.0 |  |
|  | $Na_2S_2O_8$ | 3.75 |  |
|  | $NaHCO_3$ | 3.75 |  |
| B | Styrene | 506.0 | This charge was pre-emulsified and added to Charge A over a period of 4 hours. After the addition, a solution of 0.5 g. $Na_2S_2O_8$ in 5.0 g. $H_2O$ was added to complete the conversion. |
|  | Butyl acrylate | 628.0 |  |
|  | Methacrylic acid | 140.0 |  |
|  | Tap water | 1383.0 |  |
|  | Sodium alkylaryl polyether sulphonate (28% by weight solids solution) | 56.0 |  |
|  | 1-octanethiol | 0.9 ml. |  |
|  | $Na_2S_2O_8$ | 3.75 |  |
| C | Styrene | 209.0 | The above was cooled to 80°–85°C. and this charge was added over a period of 2 hours. |
|  | Butyl acrylate | 260.0 |  |
|  | "Epon" 826 | 187.5 |  |
|  | "Dowfax" 2Al (45%) | 11.2 |  |
|  | Nonyl phenoxypoly (ethylenoxy 15) ethanol | 1.9 |  |
|  | Tap water | 563.0 |  |
|  | 1-octanethiol | 0.9 ml. |  |
|  | $Na_2S_2O_8$ | 0.9 |  |
| D | Styrene | 42.0 | The above was held for 10 minutes and then this charge was added over 30 minutes, then the reaction mass was held for a further 30 minutes. |
|  | Butyl Acrylate | 51.8 |  |
|  | "Dowfax" 2Al (45%) | 3.75 |  |
|  | Tap water | 112.0 |  |
|  | $Na_2S_2O_8$ | 0.4 |  |

Two additions of 0.5 g. $Na_2S_2O_8$ in 5.0 g. water were made followed by 2 ml. of t-butyl hydroperoxide. The resulting latex had a solids content of 44.5% by weight. This latex was reduced with additional water to a resin solids content of 4.5% by weight and was evaluated in this manner.

In a laboratory scale mat making machine, four successive 15 gram layers of 2 inches chopped glass fibres were sprayed with 25 gram portions of the 4.5% resin solid latex. No air blowing was used in this operation. The glass mat was then removed and heated 20 minutes at 195°C. in an oven. The mat was cooled between 2 teflon plates and cut into sections for testing.

The polymers of Examples 66 and 67 were tested as follows:

TEST OF SOLUBILITY RATE

The solubility of the polymers was determined by suspending 4 inches × 5 inches sections of the above prepared mats in a styrene bath at 25°C. A 100 gram clip was attached to each section and the length of time each mat supported the weight while submerged in the bath was measured as an indication of the resin solubility rate in styrene.

TENSILE STRENGTH, MAT FOLD TENSILE STRENGTH AND TENSILE RETENTION

A 3 inches × 5 inches section of mat was mounted along the 3 inches dimension in the jaws of a tensile testing machine (a Tinius Olsen 30,000 pound capacity Electromatic Universal Testing Machine) with one inch of the sample in each jaw of the tester, leaving a 3 inches × 3 inches area of the mat visible. The force necessary to tear the mat apart was recorded. Because of the difficulty in measuring mat thickness, the tensile strength is arbitrarily expressed in pounds per inch. The fold tensile strength was determined in a similar manner after a 3 inches × 5 inches sample had been folded 180° at the centre line of the long dimension. The piece was then returned to its normal position and the tensile strength measured. The fold tensile retention is the ratio of fold tensile strength to the initial tensile strength expressed in percent and is a convenient indication of binder resin brittleness and mat handleness during subsequent mat operations In the tests on the polymers of Examples 66 and 67, three 14 inches × 14 inches mats were prepared, using the polymers of each Example. Two test pieces were cut from random sections of each mat for each of the three evaluations. Therefore the results are average values determined from 6 evaluations.

| Binder | Test of Solubility Rate (-sec.) | Mat Tensile Strength (lbs/in.) | Mat Fold Tensile Strength (lbs/in.) | Tensile Retention (%) |
|---|---|---|---|---|
| Ex. 66 | 19 | 3 | 0.7 | 23 |
| Ex. 67 | 33 | 11.9 | 6.1 | 51 |

The above results indicate that the polymers of Examples 66 and 67 provide adequate binding to chopped strand fibreglass to make mats useful as styrene soluble types for subsequent use in fibreglass reinforced plastics.

EXAMPLE 68

In this Example there is illustrated the preparation of a thermosettable aqueous dispersion wherein the polymerized dispersion is blended with a water soluble resin.

A polymer comprising Styrene/Butyl acrylate/Methacrylic acid/"Epon" 828 in the respective weight proportions 64.765/27.759/7.476/2.49 was prepared as follows:

| Charge | Composition | % by weight |
|---|---|---|
| A | Sodium salt of dialkyl sulphosuccinate (85%) | 0.0792 |
|  | Sodium salt of N-cyclohexyl-N-palmitoyl-taurate (23%) | 0.1458 |
|  | Na$_2$S$_2$O$_8$ | 0.0750 |
|  | NaHCO$_3$ | 0.0750 |
|  | Tap water | 18.7500 |
| B | Styrene | 24.9063 |
|  | Butyl acrylate | 10.6750 |
|  | methacrylic acid | 2.8750 |
|  | Propylene glycol | 1.9229 |
|  | "Epon" 828 (100%) | 0.9604 |
| C | Sodium salt of N-cyclohexyl-N-palmitoyl-taurate (23%) | 0.4333 |
|  | Sodium salt of diethyl sulphosuccinate (85%) | 0.2354 |
|  | Na$_2$S$_2$O$_8$ | 0.0750 |
|  | Primary octyl mercaptan | 0.1938 |
|  | Tap water | 19.8229 |
| D | Dimethylethanolamine | 2.9750 |
|  | Tapwater | 4.9083 |
|  | Propylene glycol | 6.0771 |
|  | Tap water | 4.8146 |

METHOD

Charge A was added to a reaction vessel and heated with stirring to 80°–85°C. A pre-mix of Charge B was prepared and added to Charge C with vigorous agitation to effect emulsification. The emulsion of charges B and C was then added to A over about 3 hours at 80°–85°C., with gentle agitation. The whole was held for 30 minutes, then cooled to 60°C., after which, Charge D was added over 30 minutes, then the whole was held for a further 30 minutes and cooled to 20°C. The resulting dispersion had a pH = 9.35, total solids of 42.3%, viscosity of 0.5 poise and was low foaming.

| Preparation of Paint Containing Water Soluble Acrylic Polymer as Viscosity Control Agent | |
|---|---|
| Millbase | % by weight |
| "Titanox" RA-45 (Trade Mark) | 59.8301 |
| "Uformite" MM-83 | 14.2396 |
| Tap water | 23.9320 |
| Dimethylethanolamine | 1.9983 |

| -continued | |
|---|---|
| Preparation of Paint Containing Water Soluble Acrylic Polymer as Viscosity Control Agent | |
| Millbase | % by weight |
|  | 100.0000 |

The above was sand ground to offscale fineness.

| Let Down | % by weight |
|---|---|
| Millbase | 67.6983 |
| "Joncryl" 85(30%) (Water soluble acrylic polymer, Trade Mark) | 32.3017 |
|  | 100.0000 |

The water soluble acrylic polymer was added to the millbase with gentle agitation.

| Paint Formulation | % by weight |
|---|---|
| Polymer dispersion prepared as above | 31.7595 |
| Millbase/"Joncryl" 85(30%) | 52.0855 |
| Butyl "Cellosolve" (Trade Mark for ethylene glycol monoethyl ether) | 1.5033 |
| Propylene glycol | 5.4415 |
| Tap water | 9.1467 |
| 2-ethyl-hexanol | 0.0635 |
|  | 100.0000 |

A premix was made of the butyl "Cellosolve", propylene glycol, tap water and 2-ethyl-hexanol, the ingredients being added in the order indicated. This mix was then combined with the other ingredients listed, according to their order of listing, with gentle agitation.

The resulting paint formulation had a pH of 9.41; a total solids content of 42%; an initial viscosity of 3–4 poises at a shear rate of 10 seconds$^{-1}$; a viscosity under high shear of 1.5 poises at a shear rate of 526 seconds$^{-1}$. The flow was good. The paint was applied at 10–15 mg/sq. inch by direct roll coater. Gloss of drawdown was 20/60°; 30/81° on films of 0.5 to 0.7 mils thick.

EXAMPLE 69

| Charge | Ingredients | Grams |
|---|---|---|
| A | "Benax" 2Al (45%) | 0.1 |
|  | Water | 150 |
|  | Ammonium persulphate | 0.5 |
| B | Methyl methacrylate | 255 |
|  | Butyl methacrylate | 72 |
|  | Polyester plasticizer* | 75 |
|  | 1-octanethiol | 0.8 |
|  | Dimethylethanolamine | 5 |
|  | "Benax" 2Al | 0.2 |
|  | Water | 259 |
|  | Ammonium persulphate | 0.4 |
|  | Sulphoethyl methacrylate | 4 |
| C | Methyl methacrylate | 63 |
|  | Butyl methacrylate | 18 |
|  | "Epon" 828 | 15 |
|  | Dimethylethanolamine | 1 |
|  | 1-octanethiol | 0.2 |
|  | Water | 80 |
|  | "Triton" X-200 (28%) | 2 |
|  | "Benax" 2Al | 0.2 |
|  | Ammonium persulphate | 0.3 |

*dibenzyl diethylene glycol diadipate

Method

A solution of Charge "A" was placed in a heated flask equipped with a stirrer and an additional funnel.

An emulsion of Charge "B" was made by vigorous stirring. Continual agitation was required for stability. Charge "B" was added to the flask containing Charge "A" over 3 hours. The flask was maintained at 85°–90°C. during the addition. One-half hour after the addition was completed, an emulsion of Charge "C" was added, the addition taking place over a further 1 hour. A grossly unstable latex resulted with separation of plasticizer.

EXAMPLE 70

| Charge | Ingredients | Grams |
|---|---|---|
| A | Ammonium persulphate | 1.0 |
|  | Sodium bicarbonate | 1.0 |
|  | "Benax" 2Al | 0.1 |
|  | Water | 700 |
| B | Methyl methacrylate | 360 |
|  | Butyl acrylate | 40 |
|  | Dibenzyl sebacate | 60 |
|  | Methacrylic acid | 15 |
| C | Sulphoethyl methacrylate | 5 |
|  | Water | 50 |
| D | Methyl methacrylate | 36 |
|  | Butyl acrylate | 4 |
|  | "Epon" 828 | 15 |
|  | Water | 55 |
|  | "Benax" 2Al | 0.2 |
|  | Ammonium persulphate | 0.25 |

Method

Charge "A" was placed in a heated flask equipped with a stirrer and an addition funnel. The flask was heated to 85°–90°C. Solutions of Charges "B" and "C" were prepared and added separately to the flask over a period of 2 hours. The mixture was held for one-half hour after the additions were complete and an emulsified Charge "D" was added to the flask over a period of 30 minutes. The temperature during this last addition was reduced to 80°C. A stable latex of 40% solids content resulted. The latex contained 2.8% "Epon" 828.

A clear film was prepared from the following composition:

| | |
|---|---|
| Above prepared latex | 200 parts |
| Butyl "Cellosolve" | 45 parts |

The film was applied to "Bonderite" 1000 panels and steel panels primed with conventional automotive primers. The panels were prepared by baking for 10 minutes at 140°F., following by a further 10 minutes at 300°F. The panels were then placed face down on a Cleveland Condensing Humidity Test chamber, manufactured by the "Q" Panel Company and maintained at 140°F. for 16 + hours. The result was a loss of gloss, moderate clouding and patchiness after recovery. However, a composition stabilized with 1½% "Triton" X-200 (solids basis) would suffer extensive loss of gloss, and severe whitening without change on room temperature recovery after only 4 hours of the above test.

EXAMPLE 71

Example 70 was repeated using 1.0 g. dimethylethanolamine converted to the carbonate salt using dry ice before the addition of any of the monomers. After the addition of the monomers, 2.0 mls. of dimethylethanolamine was added to get complete conversion by adjusting pH. "Epon" 828 was then added in the same way as described in Example 70. A stable blue-white latex was obtained.

EXAMPLE 72

Example 70 was repeated using dimethyl sebacate rather than dibenzyl sebacate as the plasticizer and the Charge "D" comprised 3% "Epon" 828 as a 21% solution in a 90/10 methyl methacrylate/butyl acrylate monomer mix. The Charge "D" was successfully added without the use of additional surfactant. A stable latex resulted.

EXAMPLE 73

Example 72 was repeated using dibenzyl azelate rather than dimethyl sebacate.

EXAMPLE 74

| Charge | Ingredients | Grams |
|---|---|---|
| A | "Triton" X-200 | 2 |
|  | Water | 150 |
|  | Ammonium persulphate | 0.4 |
| B | Methyl methacrylate | 255 |
|  | Butyl methacrylate | 72 |
|  | Methacrylic acid | 15 |
|  | Polyester plasticizer | 75 |
|  | Ammonium persulphate | 0.5 |
|  | Water | 350 |
|  | Sodium allyl sulphonate | 20 |
|  | 1-octanethiol | 2.8 |
|  | Dimethylethanolamine | 4 |
|  | "Triton" X-200 | 2 |
| C | Methyl methacrylate | 63 |
|  | Butyl methacrylate | 18 |
|  | "Epon" 828 | 15 |
|  | 1-octanethiol | 0.2 |
|  | "Siponate" DS-10 | 0.3 |
|  | Water | 100 |

Method

Charge "A" was placed in a reaction flask and the flask was heated to 85°–90°C. An emulsion of Charge "B" was prepared by stirring and then added to the flask over a period of 2–3 hours at 85°C. An emulsion of Charge "C" was prepared and added to the flask over a period of 30 minutes, the temperature of the ingredients having been lowered to 80°C. before the addition. The ingredients were held at that temperature for 30 minutes and then the flask was cooled to 30°C. The result was a stable blue-white latex having a 47% solids content. On prolonged storage, some separation of the polyester was observed. An increase in the level of "Triton" X-200 would resolve this problem.

EXAMPLE 75

Example 74 was repeated using dimethylethanolamine salt of allyl sulphonate prepared by dissolving sodium salt (20 grams) in 350 grams of water. The solution was ion exchanged to pH 1.25 using "Dowex" 50W/X12 (Trade Mark for cation exchange resin). A pH of 7 was obtained by adding 3.5 ml. of dimethylethanolamine to the solution. This solution was used in Charge "B".

EXAMPLE 76

Example 74 was repeated using 20 grams of sodium vinyl sulphonate. An essentially similar result was obtained.

EXAMPLE 77

| Charge | Ingredients | Grams |
|---|---|---|
| A | Ammonium persulphate | 1 |
|  | "Benax" 2Al (45%) | 0.1 |
|  | Water | 700 |
|  | Sodium bicarbonate | 1.8 |
| B | Methyl methacrylate | 250 |
|  | Butyl acrylate | 250 |
|  | Methacrylic acid | 15 |
|  | "Benax" 2Al | 0.1 |
|  | Sulphoethyl methacrylate | 3 |
| C | Methyl methacrylate | 25 |
|  | Butyl acrylate | 25 |
|  | "Epon" 828 | 15 |
|  | "Benax" 2Al | 0.2 |
|  | Water | 65 |
|  | Ammonium persulphate | 0.25 |

Method

The ingredients of Charge "A" were placed in a flask and heated to 85°–90°C. Charge "B" was then added to the flask over a period of 2 to 3 hours. Charge "C" was next added over one-half hour. The mixture was held for 30 minutes and then cooled to 30°C. The yield was a blue-white latex with a solids content of 41–42%. The polymer components were methyl methacrylate/butyl acrylate/methacrylic acid/"Epon" 828 in the respective percentages 47.1/27.1/2.8/3.0.

EXAMPLE 78

| Charge | Ingredients | Grams |
|---|---|---|
| A | Ammonium persulphate | 0.5 |
|  | "Benax" 2Al | 0.1 |
|  | Water | 150 |
| B | Methyl methacrylate | 250 |
|  | Butyl acrylate | 250 |
|  | Methacrylic acid | 15 |
|  | Dimethylethanolamine | 5 |
|  | Sulphoethyl methyacrylate | 5 |
|  | Ammonium persulphate | 0.5 |
|  | Water | 600 |
|  | "Benax" 2Al | 0.1 |
| C | Methyl methacrylate | 25 |
|  | Butyl acrylate | 25 |
|  | "Epon" 828 | 15 |
|  | "Benax" 2Al | 0.2 |
|  | Water | 65 |
|  | Ammonium persulphate | 0.25 |

Method

The ingredients of Charge "A" were placed in a flask and heated to 85°–90°C. Charge "B" was emulsified and then added to the flask over a period of 2 to 3 hours. After Charge "C" was emulsified, it was added to the flask over ½ hour. The reaction mixture was held for 30 minutes and then cooled to 30°C. The yield was a white latex at 41% solids, somewhat less stable then the latex of Example 77. The polymer components were methyl methacrylate/butyl acrylate/methacrylic acid/"Epon" 828 in the respective percentages 47.1/47.1/2.8/3.0.

HUMIDITY TESTING OF LATEX FINISH

The polymer latexes of Examples 77 and 78 were sprayed onto steel panels ("Bonderite" 37 (Trade Mark)) to give a dry film thickness of 1.5 – 2.0 mils and baked for 30 minutes at 300°F. The panels were placed face down on a Cleveland Condensing Humidity Test chamber, manufactured by the "Q" Panel Company maintained at 140°F. for 16 + hours.

These clear films exhibited no loss of gloss and no whitening. The film obtained with the latex of Example 77 gave slight rusting under the film, while the film obtained with the latex of Example 78 gave heavy rusting.

Similar results to the above (i.e., for Examples 83 and 84) were obtained on the addition of 5% butyl "Cellosolve" (Trade Mark) to the composition and/or by baking at 350°F.

Latexes of similar composition which were made using 1.5% (solids basis) of "Triton" X-200 as the surfactant gave films that were severely degraded by this Condensing Humidity Test. This result was shown by a loss of gloss and a severe whitening after only 4 hours.

What we claim is:

1. A process for producing an aqueous dispersion of a thermosettable, solid, water insoluble, synthetic addition polymer consisting essentially of copolymerizing in water
    a. from about 98.49 to about 32.5% by weight based on the weight of total monomer solids of at least one $\alpha,\beta$-ethylenically unsaturated main monomer selected from the group consisting of styrene, lower alkyl methacrylate, lower alkyl acrylates, lower alkyl itaconates, lower alkyl maleates and lower alkyl fumarates with
    b. from about 1% to about 10% by weight based on the weight of total monomer solids of at least one $\alpha,\beta$-ethylenically unsaturated monomer containing a reactive group selected from the group consisting of acrylic acid, methacrylic acid, itaconic acid, maleic acid, fumaric acid, acrylamide, lower alkyl acrylamides, N-alkoxy modified acrylamides, diacetone acrylamide, maleamic acid, maleamide, fumaride, N-mono-lower alkyl amides, N-mono-phenylamides, hydroxyethyl methacrylate and hydroxypropyl methacrylate, said polymerization taking place in the presence of
    c. from about 0.5% to about 50.0% by weight based on the weight of total monomer solids of a plasticizer which is a 1,2-epoxy resin and of
    d. from about 0.01% to about 7.5% by weight based on the weight of total monomer solids of a stabilizing material selected from the group consisting of, alone or in combinations thereof, surface active agents, suspension agents, and water soluble, copolymerizable ionic monomers selected from the group consisting of vinyl sulphonate, allyl sulphonate and sulphoesters of the formula:-

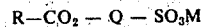

$$R-CO_2-Q-SO_3M$$

wherein R is selected from the group consisting of vinyl and $\alpha$-chloro-or $\alpha$-alkyl-substituted vinyl, Q is a divalent hydrocarbon radical having its valence bonds on different carbon atoms and M is a cation selected from the group consisting of sodium, potassium, lithium, morpholinium, lower alkyl substituted morpholinium, ammonium, substituted ammonium of the formula $NR^1_4$, wherein $R_1$ is selected from the group consisting of hydrogen, lower alkyl and lower alkanolamino.

2. A process as claimed in claim 1 wherein the addition of the monomers and plasticizer is timed such that the particles of the polymer are formed with the monomers and plasticizer located in different layers of the particles.

3. A process as claimed in claim 1 wherein the addition of the monomers and plasticizer is timed such that the particles of the polymer are formed with the monomers and plasticizer substantially uniformly distributed throughout their depths.

4. A process as claimed in claim 1 wherein the 1,2-epoxy resin plasticizer used is in the range of from about 0.5% to about 5.0% by weight, based on the weight of total monomer solids.

5. A process as claimed in claim 1 wherein the main monomer is selected from the group consisting of methyl methacrylate; styrene; styrene/butyl acrylate in the respective weight proportions of 90/10 and 80/20; methyl methacrylate/butyl acrylate in the respective weight proportions of 90/10, 80/20, 70/30, and 85/15; styrene/butyl methacrylate in the range of respective weight proportions of from 50/50 to 85/15; styrene/butyl acrylate in the respective weight proportions of 50/45 and 40/50; and methyl methacrylate/styrene/butyl acrylate in the respective weight proportions of 10/20/60; the reactive monomer is selected from the group consisting of methacrylic acid, acrylic acid, acrylamide and methacrylamide; and the plasticizer is a 1,2-epoxy resin obtained from the condensation of epichlorohydrin and diphenylol propane and is used in a proportion in the range of from about 1% to about 15% by weight, based on the weight of total monomer solids.

6. A process as claimed in claim 1 wherein the stabilizing material consists essentially of a water soluble, copolymerizable ionic monomer selected from the group consisting of vinyl sulphonate, allyl sulphonate and sulpho esters of the formula

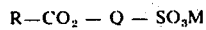

wherein R is selected from the group consisting of vinyl and α-chloro-or α-alkyl-substituted vinyl, Q is a divalent hydrocarbon radical having its valence bonds on different carbon atoms, and M is a cation selected from the group consisting of sodium, potassium, lithium, morpholinium, lower alkyl substituted morpholinium, ammonium, substituted ammonium of the formula $NR^1_4$, wherein $R_1$ is hydrogen, lower alkyl or lower alkanolamino.

7. A process as claimed in claim 1 wherein the stabilizing material consists essentially of a water soluble, copolymerizable, ionic monomer selected from the group consisting of vinyl sulphonate, allyl sulphonate and 2- sulphoethyl methacrylate.

8. A process as claimed in claim 1 wherein the stabilizing material consists essentially of from about 1% to about 5% by weight, based on the weight of total monomer solids of a water soluble, copolymerizable ionic monomer selected from the group consisting of vinyl sulphonate, allyl sulphonate and 2-sulphoethyl methacrylate together with not more than 0.2% by weight, based on the weight of total monomer solids of a surface active agent.

9. An aqueous dispersion consisting essentially of
1. water,
2. particles of a thermosettable, solid, water insoluble, synthetic addition copolymer consisting essentially of copolymerized units of a. from about 98.49% to about 32.5% by weight based on the weight of total monomer solids of a main monomer selected from the group consisting of methyl methacrylate, styrene, styrene/butyl acrylate in the repective weight proportions of 90/10 and 80/20, methyl methacrylate/butyl acrylate in the respective weight proportions of from 50/50 to 85/15, styrene/butyl acrylate in the respective weight proportions of 50/45 and 50/50 and methyl methacrylate/styrene/butyl acrylate in the respective weight proportions of 10/20/60;

b. from about 1% to about 10% by weight based on the weight of total monomer solids of at least one monomer selected from the group consisting of methacrylic acid, acrylic acid, acrylamide and methacrylamide; and c. from about 0.5% to about 50.0% by weight based on the weight of total monomer solids of a plasticizer which is a 1,2-epoxy resin; and 3. from about 0.01% to about 7.5% by weight based on the weight of total monomer solids of a stabilizing material selected from the group consisting of, alone or in combinations thereof, surface active agents, suspension agents and water soluble, copolymerisable, ionic monomers selected from the group consisting of vinyl sulphonate, allyl sulphonate and sulphoesters of the formula:

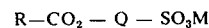

wherein R is selected from the group consisting of vinyl and α-chloro-or α-alkyl-substituted vinyl, Q is a divalent hydrocarbon radical having its valence bonds on different carbon atoms, and M is a cation selected from the group consisting of sodium, potassium, lithium, morpholinium, lower alkyl substituted morpholinium, ammonium, substituted ammonium of the formula $NR^1_4$, wherein $R_1$ is hydrogen, lower alkyl or lower alkanolamino.

10. An aqueous dispersion as claimed in claim 9 wherein the 1,2-epoxy resin plasticizer is obtained from the condensation of epichlorohydrin and diphenylol propane.

11. An aqueous dispersion as claimed in claim 9 in the form of an emulsion.

12. An aqueous dispersion as claimed in claim 9 in the form of a suspension.

13. An aqueous dispersion as claimed in claim 9 wherein the stabilizing material consists essentially of a polymerized ionic monomer selected from the group consisting of vinyl sulphonate, allyl sulphonate and 2-sulphoethyl methacrylate.

14. An aqueous dispersion as claimed in claim 9 wherein the stabilizing material consists essentially of from about 1% to about 5% by weight, based on the weight of total monomer solids of a copolymerized ionic monomer selected from the group consisting of vinyl sulphonate, allyl sulphonate and 2-sulphoethyl methacrylate together with not more than 0.2% by weight, based on the weight of total monomer solids of a surface active agent.

* * * * *